(12) United States Patent
Matz

(10) Patent No.: US 10,428,976 B2
(45) Date of Patent: Oct. 1, 2019

(54) CABLE FIXATION DEVICE

(71) Applicant: Hellermann Tyton GMBH, Tomesch (DE)

(72) Inventor: Ole Matz, Husby (DE)

(73) Assignee: HELLERMANNTYTON GMBH (DE)

( * ) Notice: Subject to any disclaimer, the term of this patent is extended or adjusted under 35 U.S.C. 154(b) by 0 days.

(21) Appl. No.: 15/826,891

(22) Filed: Nov. 30, 2017

(65) Prior Publication Data

US 2018/0172182 A1 Jun. 21, 2018

(30) Foreign Application Priority Data

Dec. 16, 2016 (EP) ..................................... 16204819

(51) Int. Cl.
| | | |
|---|---|---|
| *F16L 3/00* | (2006.01) | |
| *F16L 3/20* | (2006.01) | |
| *H02G 3/32* | (2006.01) | |
| *F16L 3/127* | (2006.01) | |
| *F16L 3/137* | (2006.01) | |
| *F16L 3/233* | (2006.01) | |

(52) U.S. Cl.
CPC ............... *F16L 3/20* (2013.01); *F16L 3/127* (2013.01); *F16L 3/137* (2013.01); *F16L 3/233* (2013.01); *H02G 3/32* (2013.01)

(58) Field of Classification Search
CPC .................. H02G 3/30; H02G 5/025
USPC ...................... 248/68.1, 69, 80, 87
See application file for complete search history.

(56) References Cited

U.S. PATENT DOCUMENTS

| | | | |
|---|---|---|---|
| 4,319,425 A * | 3/1982 | Shine .................... | A63F 7/3622 238/10 E |
| 9,508,472 B2 * | 11/2016 | Deshaies .................. | H02G 3/30 |
| 9,528,535 B2 * | 12/2016 | Massengill .............. | F16B 1/00 |
| 2012/0292469 A1 | 11/2012 | Miekley et al. | |
| 2013/0119208 A1 * | 5/2013 | Geiger .................... | F16L 3/233 248/68.1 |
| 2014/0055943 A1 | 2/2014 | Chang et al. | |
| 2015/0076087 A1 * | 3/2015 | Kaml .................. | F16M 13/022 211/26 |

FOREIGN PATENT DOCUMENTS

| | | |
|---|---|---|
| CN | 205583563 U | 9/2016 |
| FR | 2 225 396 A7 | 11/1974 |
| WO | 2013/053922 A1 | 4/2013 |
| WO | 2015/061429 A1 | 4/2015 |

* cited by examiner

*Primary Examiner* — Steven M Marsh
(74) *Attorney, Agent, or Firm* — Robert J. Myers

(57) ABSTRACT

A fixation device for holding a bundle of cables onto a structure. The fixation device includes a head member arranged on a leg member extending from a fixation foot configured to affix the fixation device on the structure to the head member for positioning and fixing the bundle of cables. The fixation device further includes a positioning feature, thereby enabling a plurality of relative positioning of the head member and the leg member.

20 Claims, 9 Drawing Sheets

FIG. 1

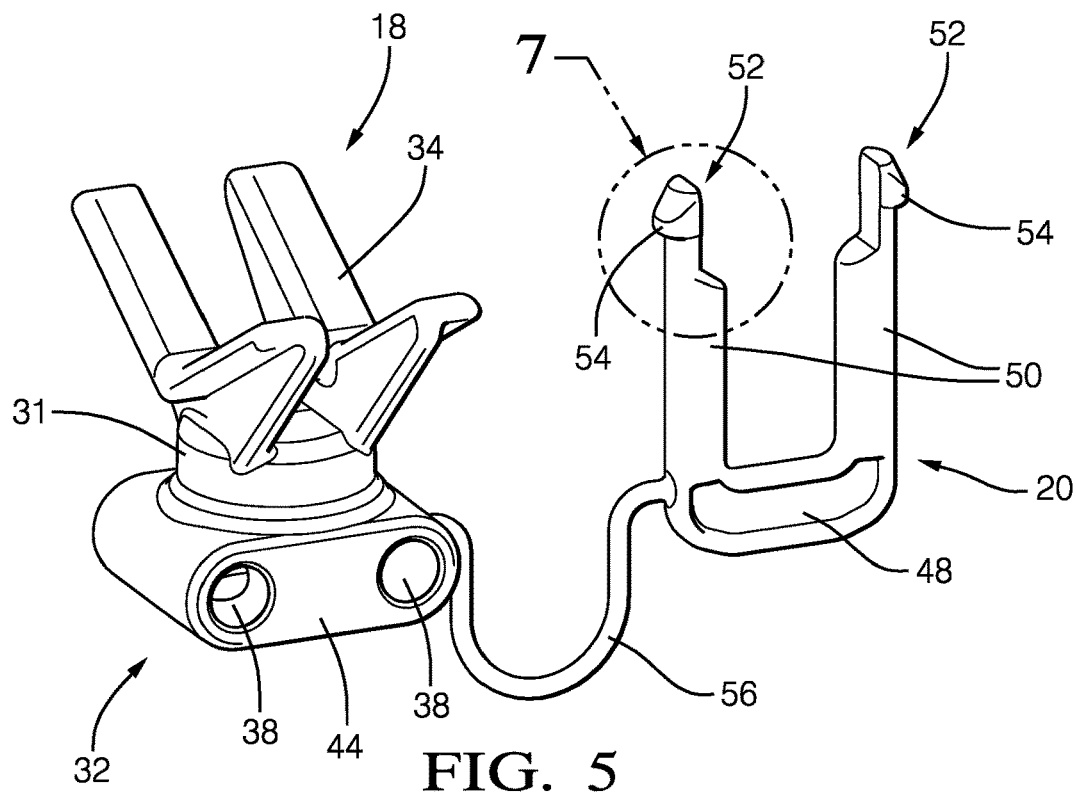
FIG. 5
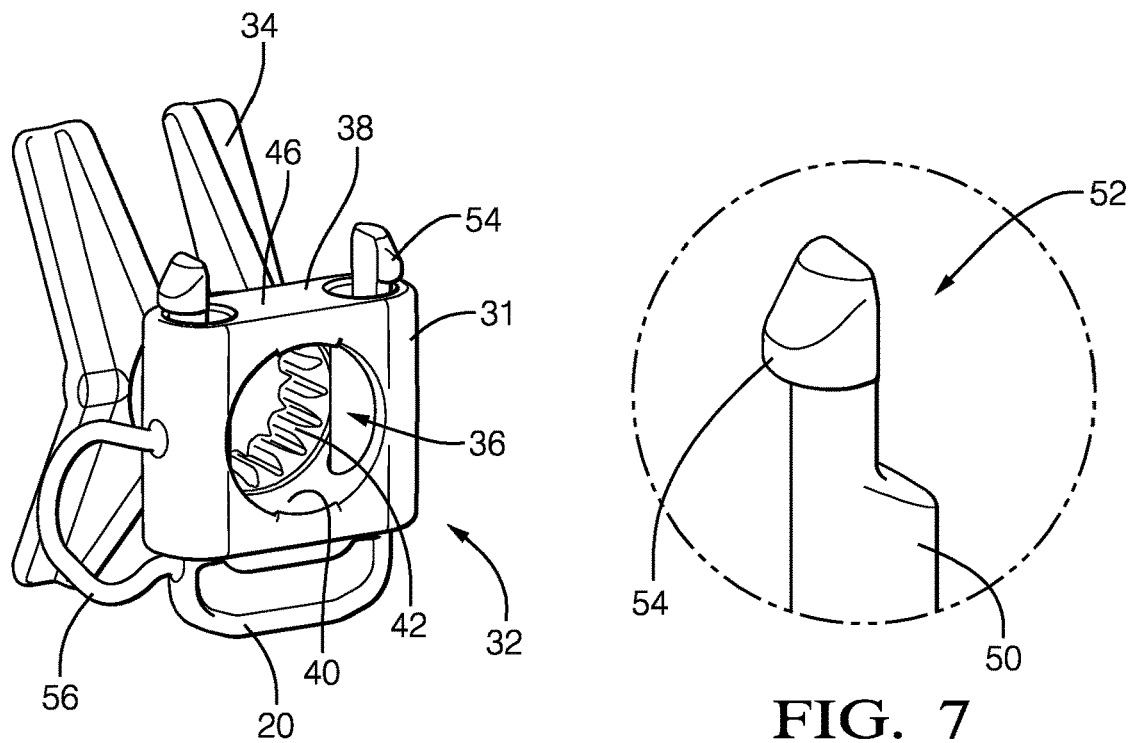
FIG. 6
FIG. 7

CABLE FIXATION DEVICE

CROSS-REFERENCE TO RELATED APPLICATION

This application claims the benefit under 35 U.S.C. § 119(a) of Patent Application No. 16204819.3 filed in the European Patent Office on Dec. 16, 2016, the entire disclosure of which is hereby incorporated by reference.

TECHNICAL FIELD OF THE INVENTION

The present invention relates to a fixation device for holding in place a bundle of electric cable and, more precisely to a positioning feature enabling several position configuration of the fixation device.

BACKGROUND OF THE INVENTION

In a plane, a car, a boat, a building or any other structure having an electrical network, wire harnesses are routed and attached to the structure via standoff features and ties wrapped around bundles of cables. Such features comprise a leg member having a support head arranged at one end and a fixation foot at the other end. The tie attaches the cables in the support head and, the fixation foot enables to attach the assembly to the structure via means such as screws, rivets or bondage. The fixation features typically integrate heavy and costly metallic parts and, the complex routing of the harness requires several different type of the features. Lighter and easier to use devices are demanded.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

Accordingly, it is an object of the present invention to resolve the above mentioned problems.

According to one embodiment of the invention, a fixation device is provided. The fixation device includes a head member arranged on a leg member. The leg member extends from a fixation foot for fixing the fixation device on the structure to the head member for positioning and fixing the bundle of cables. The fixation device also includes a positioning feature enabling a plurality of relative positioning of the head member and the leg member. The leg member and the head member are distinct members. The positioning feature further enables complementary engagement of the distinct members. The fixation device further includes a key configured to prevent disengagement of the head member and the leg member. The key comprises a first arm inserted in a key hole of the head member and engaged in a hollow arranged on the leg member. The hollow is an annular groove surrounding the leg member. The key hole is tangent to the groove so the first arm registers in both the key hole and the groove prevents disengagement of the head member from the leg member.

The positioning feature may include a male-female engagement feature. The male-female engagement feature may have toothed connections. The positioning feature may define between 10 to 30 teeth, thereby enabling a discrete selection of 10 to 30 relative positions.

The head member and the leg member may both be formed by plastic molding.

The key may comprise a holding portion from which extends the first arm. The key may be provided with a snap-fit tooth configured to engage a complementary indent feature when the key is in place in the key hole. An end of the first arm may protrude outside the key hole when the key is in place. The snap-fit tooth may be arranged at a protruding end of the first arm to engage an edge of the opening of the key hole forming the complementary indent feature.

The first arm may be elastically flexible and removal of the key may be accomplished by elastically bending of the first arm removing the snap-fit tooth from the complementary indent feature.

The key may include a second arm extending parallel to the first arm, the first and second arms engaging in two different key holes provided in the head member, the two different key holes are both parallel to one another and tangent to the groove in diametrically opposed areas. Each of the first and second arms may be provided with a locking device and wherein removal of the key involves elastically bending first and second arms toward one another.

The key may be formed by plastic molding.

The fixation device may further comprise a flexible link extending from the head member to the key. The head member, the flexible link and the key may be integrally formed.

The fixation device may also include a tie inserted in a slot provided in the head member, or in the leg member. The tie is configured to be looped and tightened around the bundle of cables.

According to another embodiment of the invention, a method of arranging and fixing a bundle of cables on a structure is provided. The method includes the step of providing a fixation device comprising a head member arranged on a leg member, the leg member extending from a fixation foot for fixing the fixation device on the structure to the head member for positioning and fixing the bundle of cables, a positioning feature enabling a plurality of relative positioning of the head member and the leg member, wherein the leg member and the head member are distinct members, wherein the positioning feature further enables complementary engagement of the distinct members, and a key configured to prevent disengagement of the head member and the leg member, wherein the key comprises an arm inserted in a key hole of the head member and engaged in a hollow arranged on the leg member, wherein the hollow is an annular groove surrounding the leg member, the key hole is tangent to the groove so the arm registers in both the key hole and the groove prevents disengagement of the head member from the leg member. The method also includes the steps of fixing the leg member onto the structure via fixation means such as rivets, bondage or screws and arranging the head member in a chosen position relative to the leg member.

The arranging step may also include the substeps of orienting the head member relative to the leg member in the chosen position and engaging the head member on the leg member.

The method may also comprise the step of locking the head member onto the leg member by arranging the key.

The method may further include the steps of providing a tie and inserting the tie in a slot provided in the head member and looping and tightening the tie around the bundle of cables.

The step of inserting the tie in a slot provided in the head member and looping and tightening the tie around the bundle of cables may be performed before the step of locking the head member onto the leg member by arranging the key.

Further features and advantages will appear more clearly on a reading of the following detailed description of the preferred embodiment, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIGS. 5, 6 and 7 present a head member of the fixation device with a view on a female half of the positioning feature and of a locking key according to an embodiment of the invention;

DETAILED DESCRIPTION OF THE INVENTION

Figure 1:
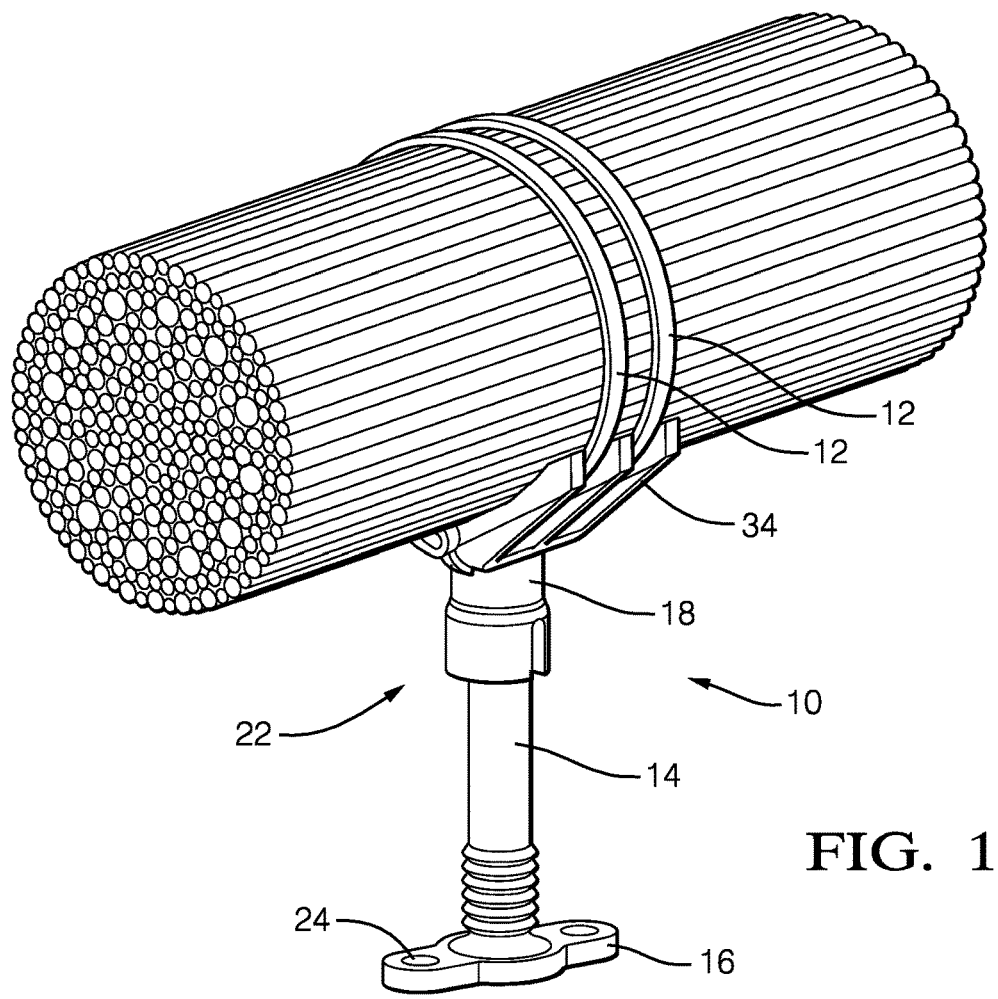
FIGS. 1 and 2 are perspective views of electric cable bundles wrapped to a fixation device according to an embodiment of the invention.
Figure 2:
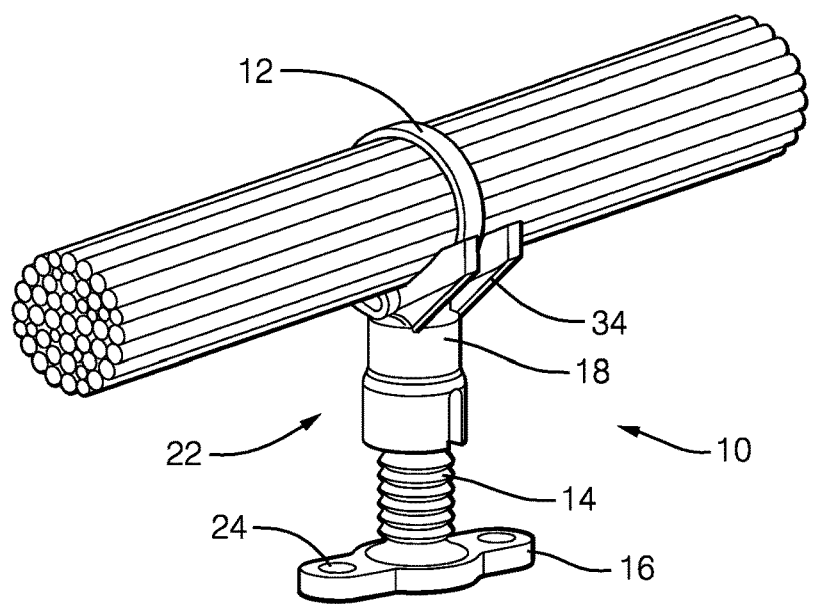

A general presentation of typical bundles wrapped and fixed to fixation devices 10 as per the invention is shown of FIGS. 1 and 2, a large bundle requiring two ties 12 as shown in FIG. 1 and, a smaller bundle requiring only one tie 12 as shown in FIG. 2. The fixation devices 10 are formed from a plastic material, such as polyamide or polybutylene terephthalate, by an injection molding process and define a leg member 14 provided at a lower end with an integral fixation foot member 16 and with an independent head member 18 arranged at an opposite top end of the leg member 14 and fixed there by a key 20.

Figure 3:
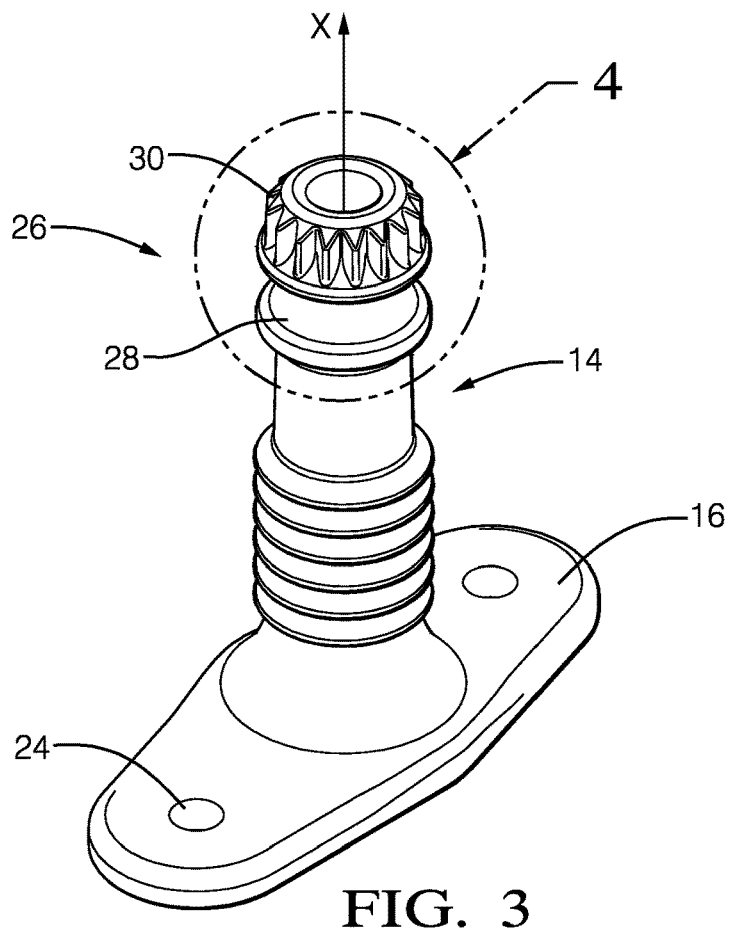
FIGS. 3 and 4 present a leg member of the fixation device and a magnified view of a male half of a positioning feature according to an embodiment of the invention.
Figure 4:
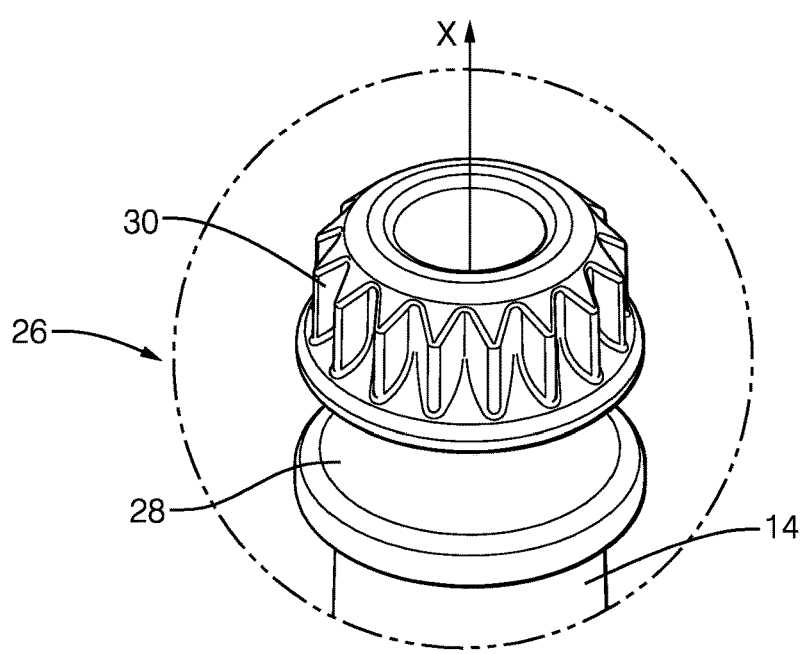

More in details in reference to the FIGS. 3 and 4, the head member 18 and the leg member 14 further define together a complementary positioning feature 22 enabling orientation of the head member 18 and insertion and locking onto the leg member 14.

Figure 18:
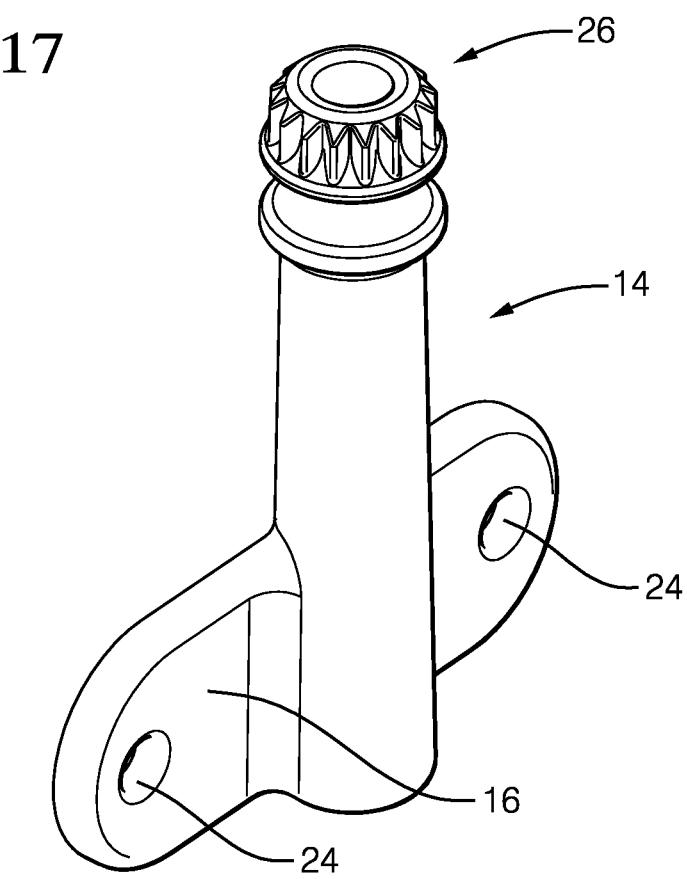

At the other end, the foot member 16 is typically planar having an upper face wherefrom the leg member 14 extends and an under face configured to be arranged in surface contact against a wall of the structure. The foot member 16 is provided with fixation features such as screw or rivets holes 24 or with an under face arranged for being glued onto the wall. Also, the leg member 14 integrally extends from the foot member 16 in a perpendicular, or parallel, orientation as shown in FIG. 18.

Using the general orientation of the FIGS. 3 and 4, the leg member 14 upwardly extends about a main axis X, in a cylindrical pillar toward a male half 26 of the positioning feature 22, the male half 26 comprising an annular groove 28 surrounding the cylindrical pillar and a male teeth wheel 30 forming the very end of the upward leg member 14.

The head member 18 shown in FIGS. 5, 6 and 7 comprises an integrally molded body 31 defining a female half 32 of the positioning feature 22 and a bundle support feature 34 that, in the embodiments presented comprises V-like members configured to receive the cables. Alternatively, other shapes of bundle support features 34 U-like or O-like members exists. The female half 32 of the positioning feature 22 comprises a cylindrical recess 36 and two parallel key holes 38 defined in the body 31.

The cylindrical recess 36 comprises a smooth portion forming a female cylinder 40 of revolution arranged proximal the opening of the cylindrical recess 36 in a bottom face of the body and, a toothed portion forming a female teeth wheel 42 complementary to the male teeth wheel 30 of the leg and arranged proximal the inner bottom end of the cylindrical recess 36. The male teeth wheel 30 and the female teeth wheel 42 are complementary as having the same number of teeth, teeth having the same module, the male teeth wheel 30 is configured to register into the female teeth wheel 42.

The two key holes 38 are parallel to each other and they extend through the body perpendicular and tangent to the cylindrical recess 36. Each of the two key holes 38 open in a front faces 44 of the body 31 and an opposite rear face 46. The two key holes 38 are tangent to the cylindrical recess 36 and open in diametrically opposed areas of the smooth cylinder 40.

Complementary to the two key holes 38, the key 20 has U-shape comprising a holding portion 48 from the opposite ends of which two arms 50 extend parallel to each other toward a distant locking end 52. The two arms 50 having the same offset as the two key holes 38, the key 20 can be inserted therein and, as shown on the bottom view of FIG. 6, the locking ends 52 protrude in the rear face 46 of the body 31 and also, the middle portion of the two arms 50 radially protrude in the smooth cylinder 40 of the cylindrical recess 36.

Moreover, the two arms 50 have a circular section up to the locking ends 52 which section is only semi-circular. By being reduced by half, the locking ends section provide resilient properties to the locking ends 52 which therefore can slightly bent toward one another. The removed, or non-molded, portions of the reduced section are the halves of the arms that are facing one another or, that are on the "inside" of the arms. Also, each of the locking ends 52 is provided with a tooth 54 formed at the very end of the two arms 50 and magnified in FIG. 7, the tooth 54 outwardly protruding opposite the reduced section area and defining an abrupt shoulder 56 transition to the arm transverse to the main axis X.

The embodiment presented further comprises a flexible link 56 extending from a side face of the head member 18 to the holding portion 48 of the key 20, the link is integrally formed with the head member 18 and the key 20.

Alternatively, the fixation device could be made without the flexible link and the head member 18 and the key 20 may be separately formed.

Figure 8:
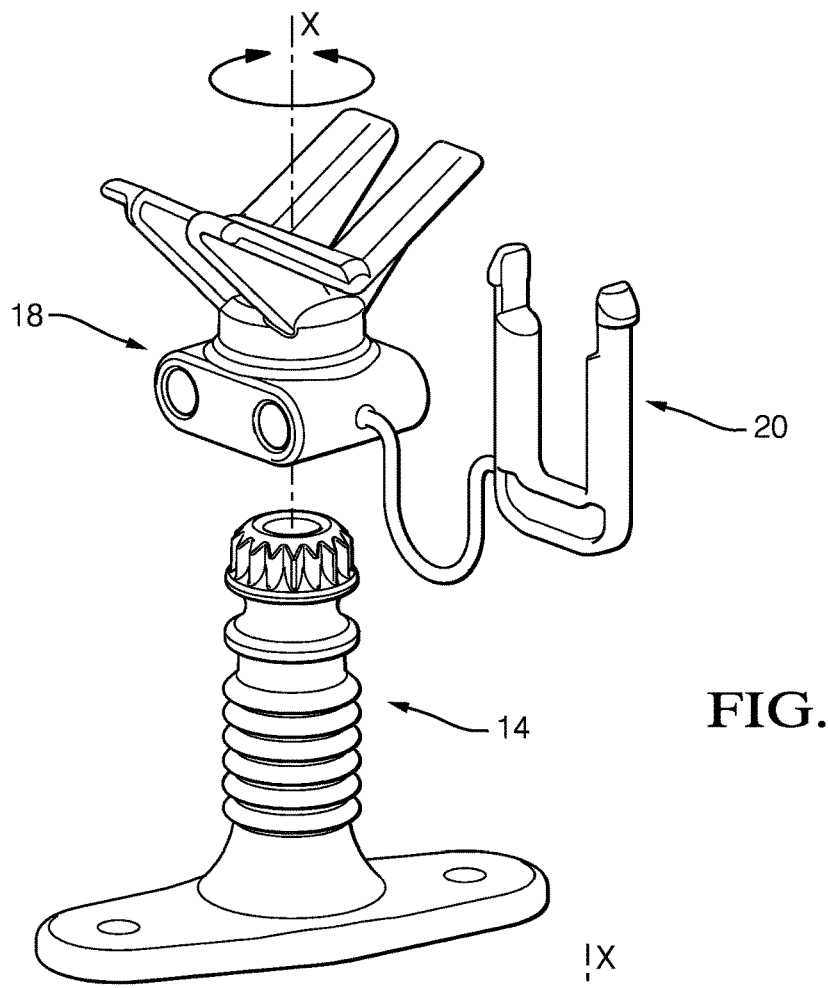
FIGS. 8 and 9 present the orientation and assembly of the fixation device according to an embodiment of the invention.
Figure 9:
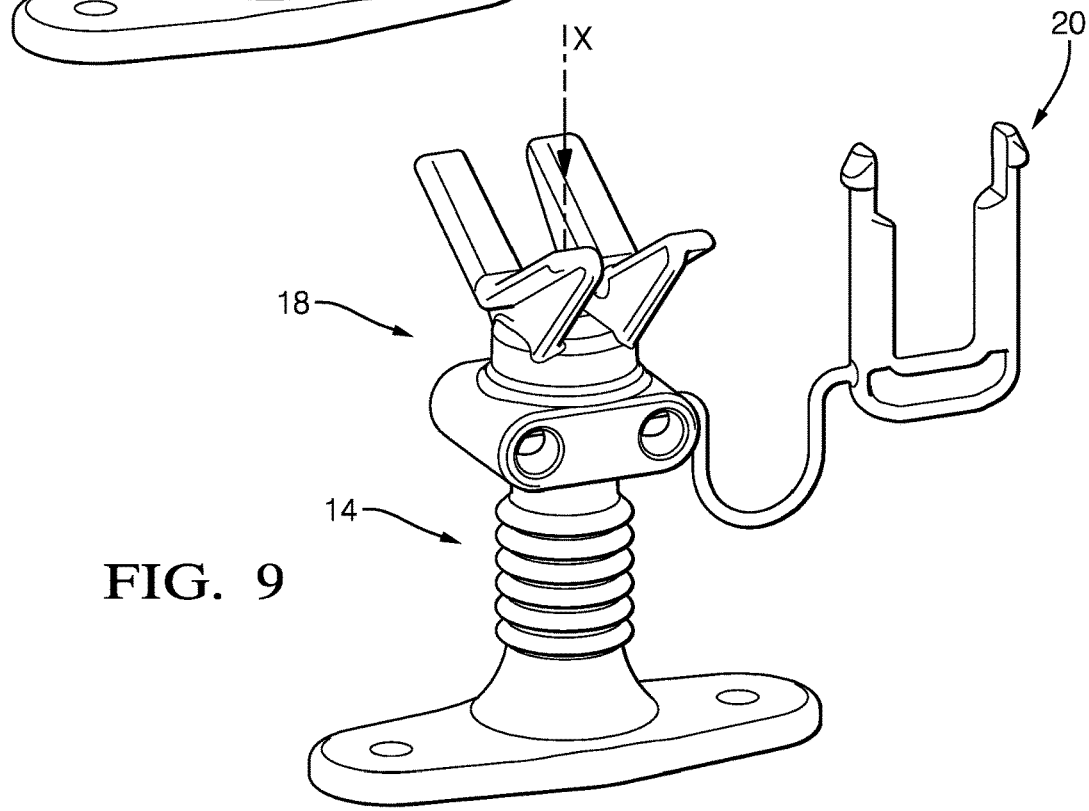

The assembly of the fixation device 10 is shown in FIGS. 8 and 9 and is done by complementary arrangement of the head member 18 over the leg member 14 and more precisely by insertion of the female half 32 of the positioning feature of the head member 18 over the male half 26 of the positioning feature of the leg member. Prior to the insertion of the male teeth wheel 30 into the female teeth wheel 42, as shown in FIG. 8, the head member 18 is angularly oriented relative to the leg member 14, the increment of orientation is the number of teeth of the wheels. It has been found interesting to form twenty eight teeth for an incrementing step of 13°, although a larger step of 22.5° can be obtained by forming only sixteen teeth per wheel. This orientation characteristic enables placing and fixing the leg members 14 first on the wall of the structure then, arranging the head members 18 in accordance with the routing of the wire harness. Also, it enables an adjustment of the orientation of the head so that the head does not generate side forces on the wires.

Figure 10:
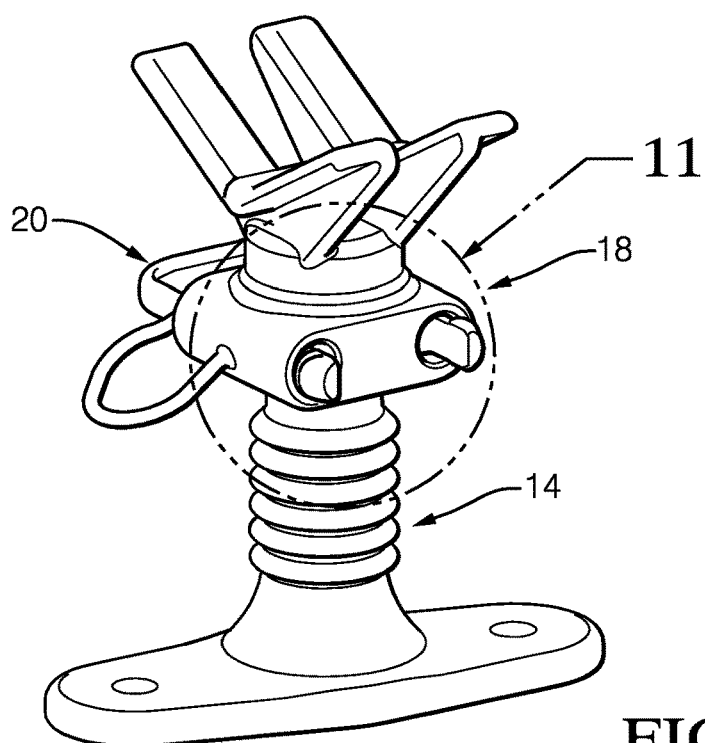
FIGS. 10 and 11 present locking of the fixation device according to an embodiment of the invention.
Figure 11:
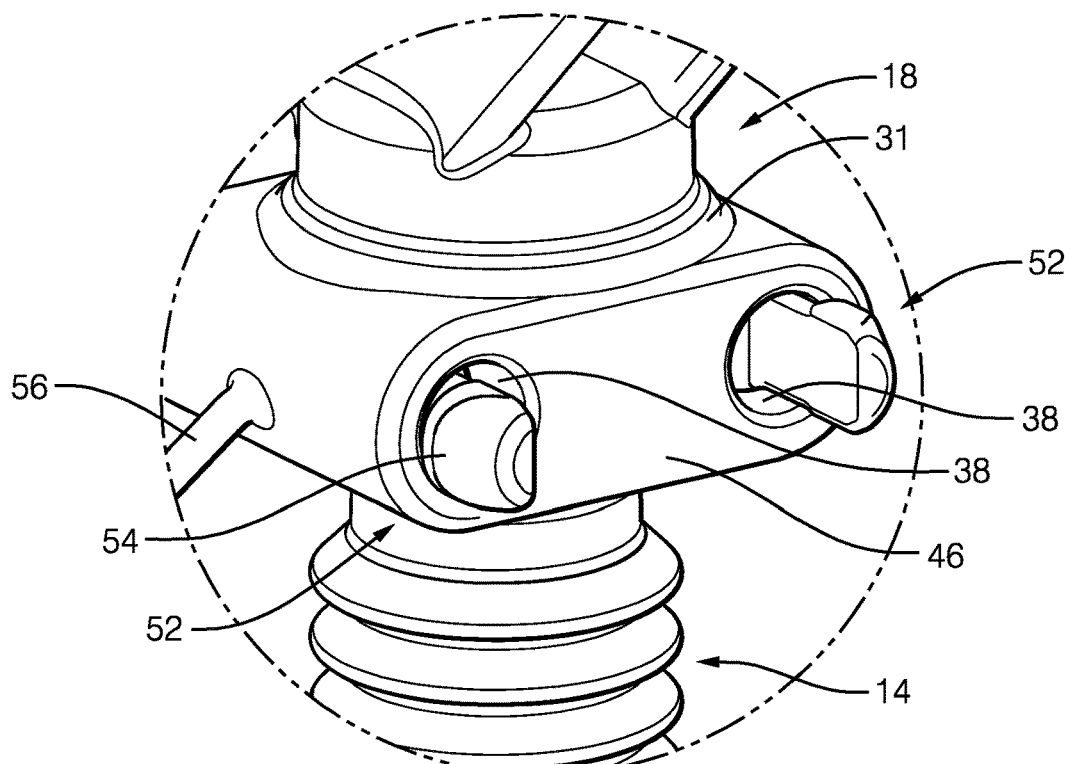

Once properly oriented, the head member 18 is inserted, FIG. 9, on the end of the leg member 14, the smooth cylinder 40 of the head facing the groove 28 below the male teeth wheel. Then the head member 18 is locked in position by insertion of the two arms 50 of the key 20 into the two key holes 38. The middle portion of the two arms 50 that radially protrudes in the smooth cylinder, indeed protrude in the groove 28 preventing axial X disengagement of the head member 18. Also, the teeth 54 outwardly protruding from the arms have urged the locking ends 52 to slightly bend inwardly during the insertion of the two arms 50 in the two key holes 38 and, when the insertion is complete the teeth 54 exit the two key holes 38 and, the locking ends 52 resiliently bent back outwardly to a rest position where the teeth 54 automatically register against the edges of the holes, FIGS. 10 and 11, on the rear face 46 of the head, thus preventing disengagement of the key 20 without a volunteer inward bending action on the locking ends 52.

The teeth wheels enable angular orientation of the head over the leg and forbid a change in orientation; the middle of the arms protruding in the groove forbid disengagement of the head and, the locking ends 52 lock the assembly in a single configuration. In an alternative not represented, the wheels are provided tooth-less enabling the head member 18 to angularly rotate an self adjust in the direction required.

Figure 12:
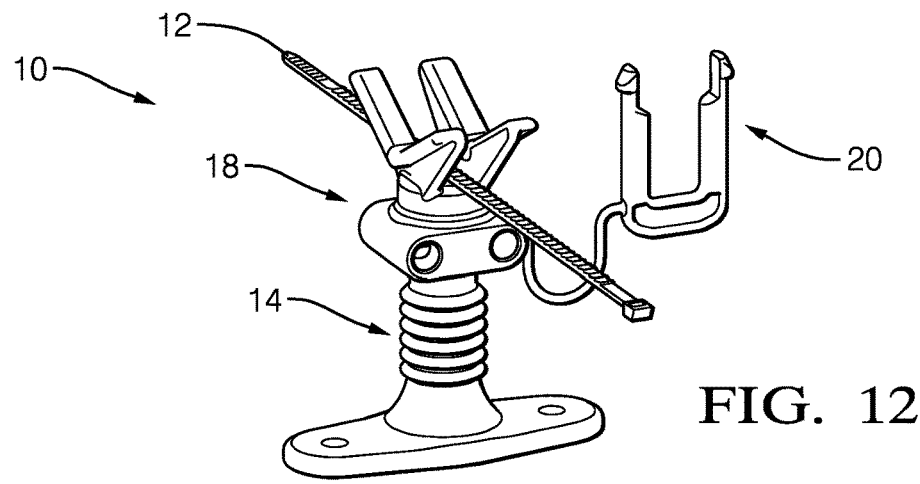
FIGS. 12, 13 and 14 present steps of a method to assemble a bundle of cables with a fixation member according to an embodiment of the invention.
Figure 13:
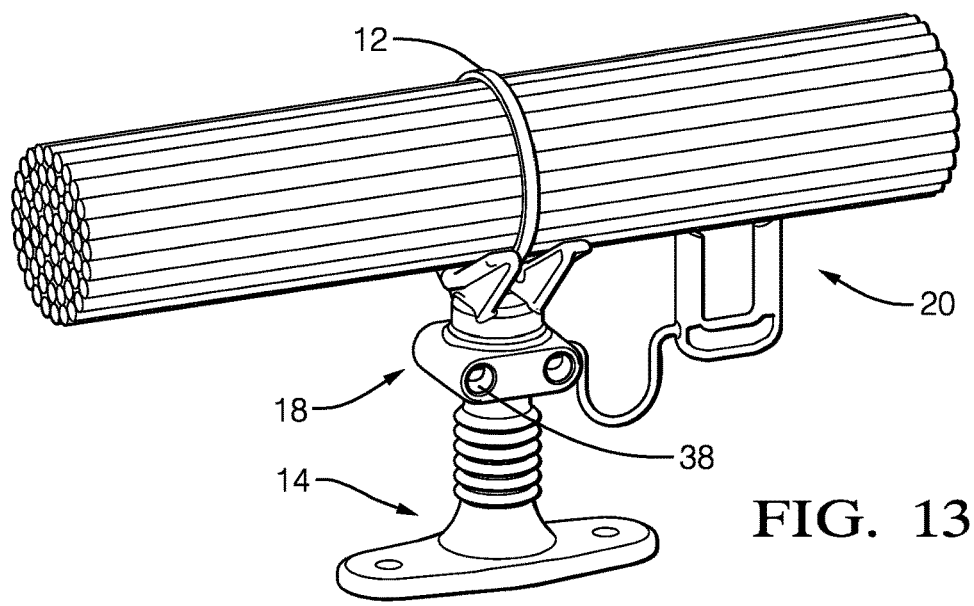
Figure 14:
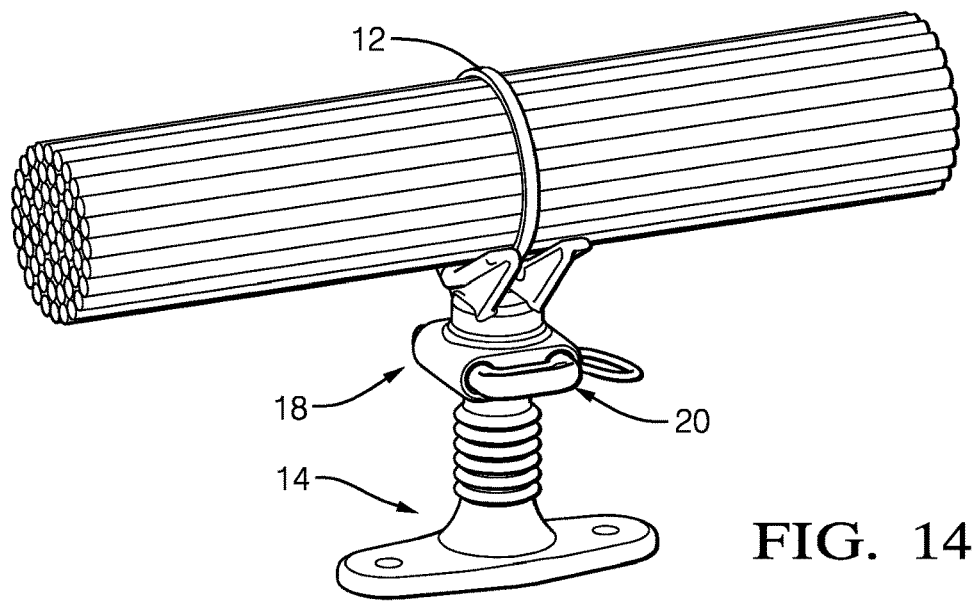
Figure 15:
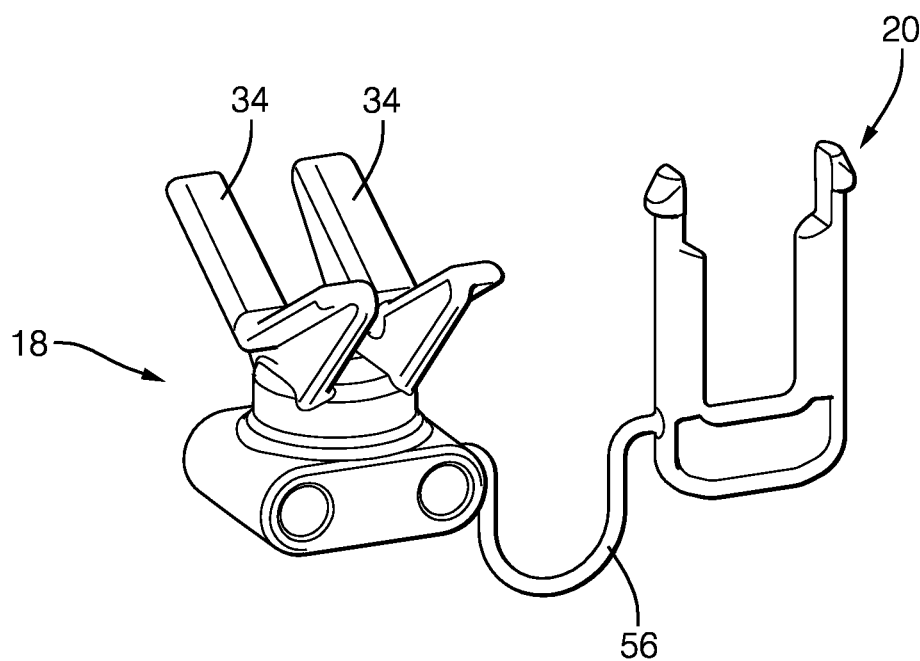
FIGS. 15, 16, 17 and 18 present alternative embodiments of the support members and of the leg members according to an embodiment of the invention.
Figure 16:
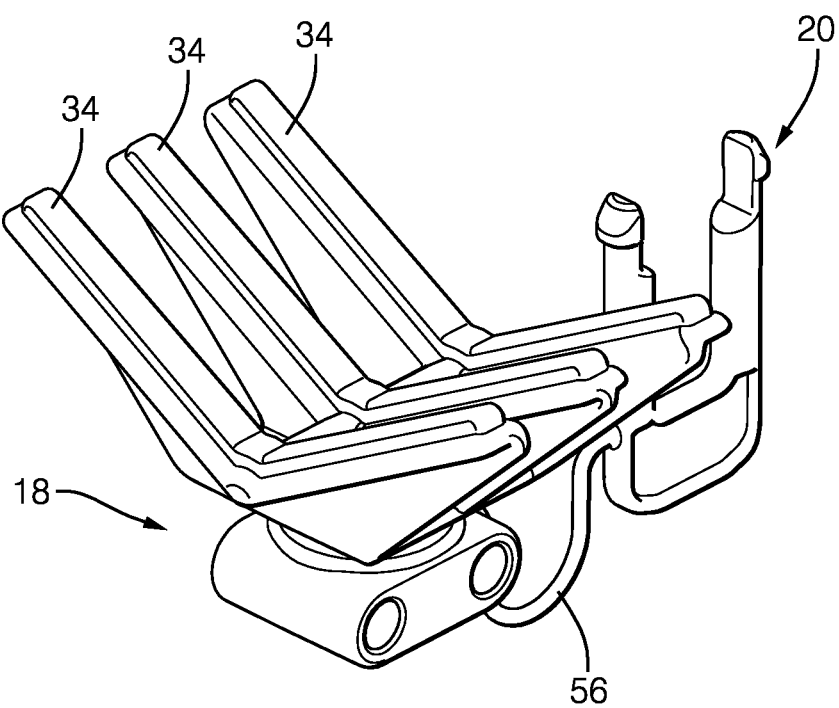
Figure 17:
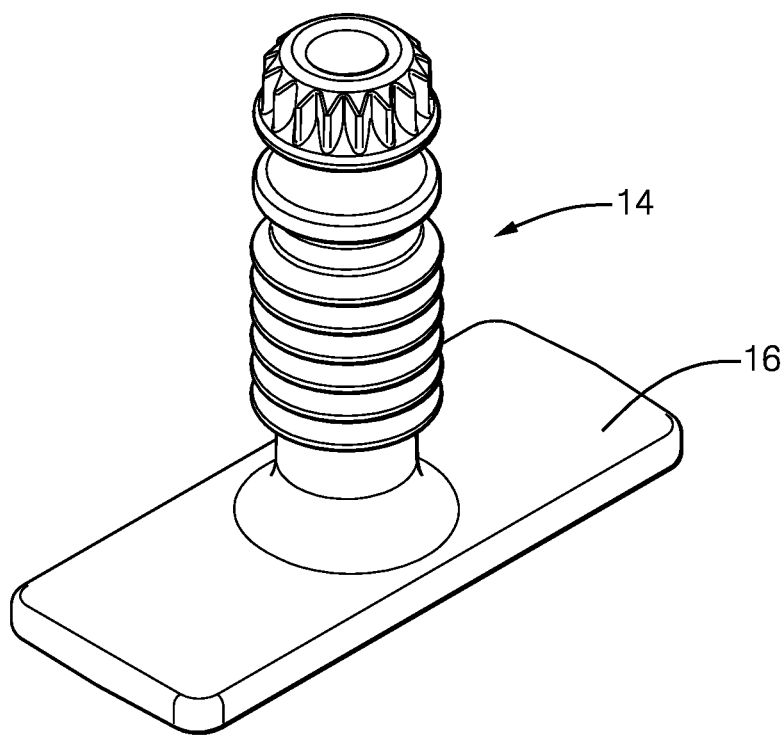

Once the harness is positioned in the bundle support features 34, the tie 12 is inserted in a slot arranged in the body 31 of the head member 18, FIGS. 12, 13 and 14 and, the tie 12 is wrapped around the harness and tightened with a special tool not shown. In a preferred method of arrangement, the key 20 is inserted after the bundle is wrapped by a tie 12. Following this step sequence enables the user to adjust the angular orientation of the head member without having to disengage the key.

As shown on the FIGS. 15 to 18, the positioning feature 22 can be applied on a plurality of embodiments wherein the head is provided with two or three V-like support members, using one or two ties 12, wherein the foot member 16 and the leg member 14 can be coplanar or perpendicular, the leg itself is long as shown in FIG. 1 or short, as shown in FIG. 2. To avoid damages on the cables, soft cushions are arranged on the V-like support and enable to protect the bundle from direct contact with the head member or with a sharp edge.

Figure 19:
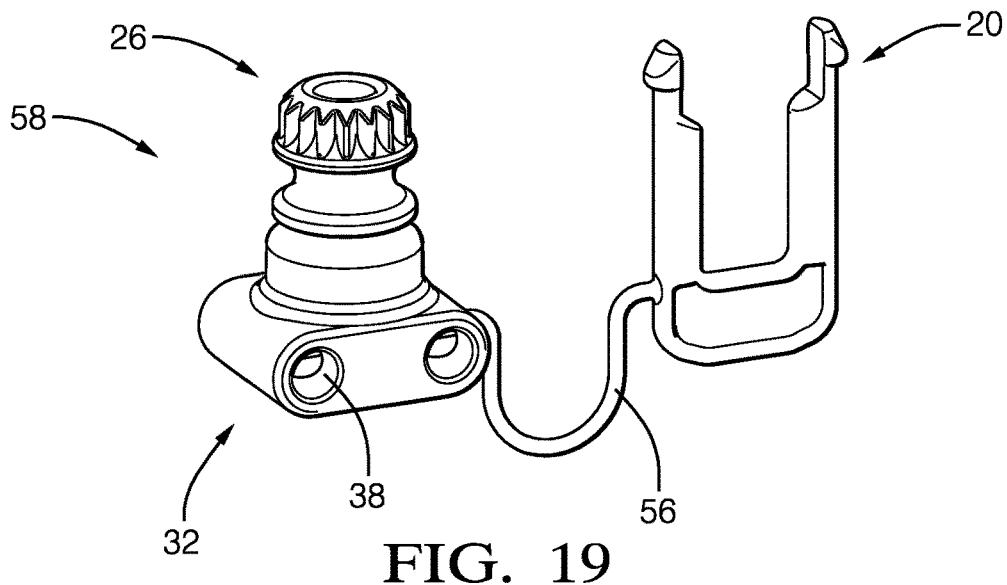
FIGS. 19 and 20 present a leg extension member using a similar concept as the support member according to an embodiment of the invention.
Figure 20:
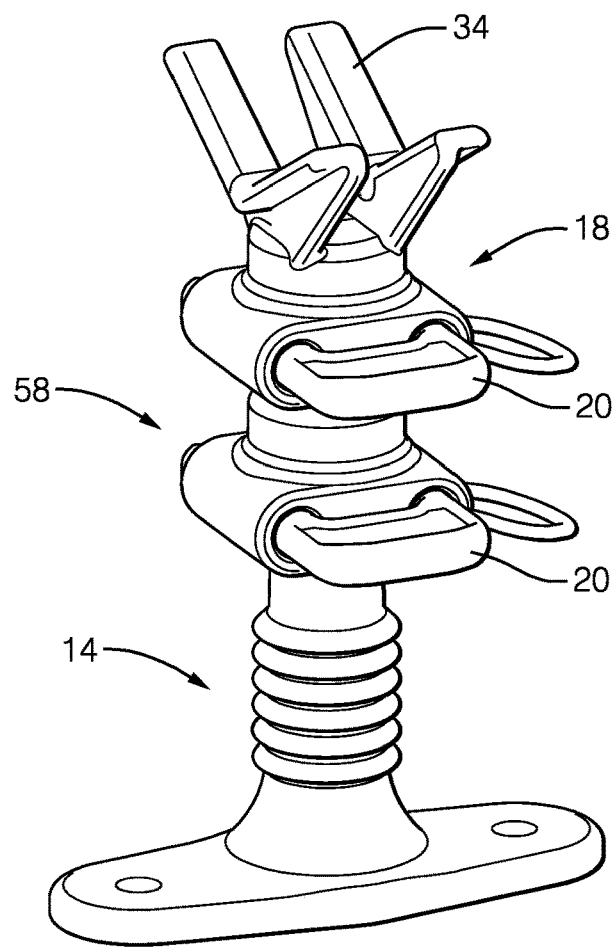

Also, as shown of FIGS. 19 and 20, a leg extension member 58 can be made and inserted between the leg member 14 and the head member 18 in order to extend the height of the leg member 14. Such leg extension member 58 comprises a female half 32 of the positioning feature 22 for complementary arrangement at the end of the leg and, a male half 26 for receiving the head member 18. Integrally formed with its own key 20, the leg extension member 58 is also fixed in position relative to the leg member.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

In the following claims, the terms "including" and "in which" are used as the plain-English equivalents of the respective terms "comprising" and "wherein." Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

Further, the limitations of the following claims are not written in means-plus-function format and are not intended to be interpreted based on 35 USC § 112(f), unless and until such claim limitations expressly use the phrase "means for" followed by a statement of function void of further structure.

I claim:

1. A fixation device configured to secure a bundle of cables to a structure, the fixation device comprising:
   a head member arranged on a leg member, the leg member extending from a fixation foot for fixing the fixation device on the structure to the head member for positioning and fixing the bundle of cables;
   a positioning feature enabling a plurality of relative positioning of the head member and the leg member, wherein the leg member and the head member are distinct members, wherein the positioning feature further enables complementary engagement of the distinct members; and
   a key configured to prevent disengagement of the head member and the leg member, wherein the key comprises a first arm inserted in a key hole of the head member and engaged in a hollow arranged on the leg member, wherein the hollow is an annular groove surrounding the leg member, the key hole is tangent to the groove so the first arm registers in both the key hole and the groove prevents disengagement of the head member from the leg member.

2. The fixation device according to claim 1, wherein the positioning feature includes a male-female engagement feature.

3. The fixation device according to claim 2, wherein the male-female engagement feature comprises toothed connections.

4. The fixation device according to claim 3, wherein the positioning feature comprises between 10 to 30 teeth, thereby enabling a discrete selection of 10 to 30 relative positions.

5. The fixation device according to claim 1, wherein the head member and the leg member are both formed by plastic molding.

6. The fixation device according to claim 1, wherein the key comprises a holding portion from which extends the first arm.

7. The fixation device according to claim 1, wherein the key is provided with a snap-fit tooth configured to engage a complementary indent feature when the key is in place in the key hole.

8. The fixation device according to claim 7, wherein an end of the first arm protrudes outside the key hole when the key is in place and wherein the snap-fit tooth is arranged at a protruding end of the first arm to engage an edge of the opening of the key hole forming the complementary indent feature.

9. The fixation device according to claim 7, wherein the first arm is elastically flexible and wherein, removal of the key is done by elastically bending of the first arm removing the snap-fit tooth from the complementary indent feature.

10. The fixation device according to claim 1, wherein the key comprises a second arm extending parallel to the first arm, the first and second arms engaging in two different key holes provided in the head member, the two different key holes are both parallel to one another and tangent to the groove in diametrically opposed areas.

11. The fixation device according to claim 10, wherein each of the first and second arms is provided with a locking device and wherein removal of the key involves elastically bending first and second arms toward one another.

12. The fixation device according to claim 1, wherein the key is formed by plastic molding.

13. The fixation device according to claim 1, further comprising a flexible link extending from the head member to the key.

14. The fixation device according to claim 13, wherein the head member, the flexible link and the key are integrally formed.

15. The fixation device according to claim 1, further comprising a tie inserted in a slot provided in the head member, or in the leg member, the tie is configured to be looped and tightened around the bundle of cables.

16. A method of arranging and fixing a bundle of cables on a structure, the method comprising the following steps:
  a) providing a fixation device comprising a head member arranged on a leg member, the leg member extending from a fixation foot for fixing the fixation device on the structure to the head member for positioning and fixing the bundle of cables, a positioning feature enabling a plurality of relative positioning of the head member and the leg member, wherein the leg member and the head member are distinct members, wherein the positioning feature further enables complementary engagement of the distinct members, and a key configured to prevent disengagement of the head member and the leg member, wherein the key comprises an arm inserted in a key hole of the head member and engaged in a hollow arranged on the leg member, wherein the hollow is an annular groove surrounding the leg member, the key hole is tangent to the groove so the arm registers in both the key hole and the groove prevents disengagement of the head member from the leg member;
  b) fixing the leg member onto the structure via fixation means; and
  c) arranging the head member in a chosen position relative to the leg member.

17. The method according to claim 16, wherein the arranging step c) comprises the substeps of:
  d) orienting the head member relative to the leg member in the chosen position; and
  e) engaging the head member on the leg member.

18. The method according to claim 17, wherein the method further comprises the step of:
  f) locking the head member onto the leg member by arranging the key.

19. The method according to claim 18, further comprising the steps of:
  g) providing a tie; and
  h) inserting the tie in a slot provided in the head member and looping and tightening the tie around the bundle of cables.

20. The method according to claim 19, wherein the inserting step h) is performed before the locking step f).

* * * * *